(12) United States Patent
Guha et al.

(10) Patent No.: US 8,169,897 B2
(45) Date of Patent: May 1, 2012

(54) ACHIEVING HIGH-RATE MULTI-HOP DATA DELIVERY IN VEHICULAR NETWORKS

(75) Inventors: Ratul K. Guha, Kendall Park, NJ (US); Wai Chen, Parsippany, NJ (US); Jasmine Chennikara-Varghese, Somerset, NJ (US); Stephanie Demers, Westfield, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 122 days.

(21) Appl. No.: 12/563,420

(22) Filed: Sep. 21, 2009

(65) Prior Publication Data

US 2010/0074114 A1 Mar. 25, 2010

Related U.S. Application Data

(60) Provisional application No. 61/098,430, filed on Sep. 19, 2008.

(51) Int. Cl.
*H04J 1/16* (2006.01)
(52) U.S. Cl. ............................... 370/229; 370/237
(58) Field of Classification Search ............. 370/238, 370/328, 315, 252, 254, 400, 225, 226, 227, 370/228, 310, 316, 229, 230, 237; 455/456.1, 455/7, 8, 11.1, 12.1, 13.1, 73, 575; 701/115, 701/117, 118, 119, 210, 209, 300, 70, 202, 701/200, 201; 340/435, 438, 902, 903, 905
See application file for complete search history.

(56) References Cited

U.S. PATENT DOCUMENTS

| | | | |
|---|---|---|---|
| 6,370,475 B1 * | 4/2002 | Breed et al. | 701/301 |
| 6,862,524 B1 | 3/2005 | Nagda et al. | |
| 7,251,223 B1 * | 7/2007 | Barrett et al. | 370/315 |
| 7,532,130 B2 * | 5/2009 | Curtis | 340/902 |
| 7,864,775 B2 * | 1/2011 | Shackleton et al. | 370/395.3 |
| 7,894,981 B2 * | 2/2011 | Yamane et al. | 701/118 |
| 2004/0073361 A1 * | 4/2004 | Tzamaloukas et al. | 701/210 |
| 2004/0140909 A1 * | 7/2004 | Meadows et al. | 340/905 |
| 2007/0115868 A1 * | 5/2007 | Chen et al. | 370/315 |
| 2007/0160006 A1 | 7/2007 | Roggero et al. | |
| 2007/0271079 A1 * | 11/2007 | Oguchi et al. | 703/8 |
| 2008/0002721 A1 * | 1/2008 | Greene et al. | 370/400 |

(Continued)

OTHER PUBLICATIONS

International Search Report dated Dec. 10, 2009.

*Primary Examiner* — Chi Pham
*Assistant Examiner* — Abdullah Riyami
(74) *Attorney, Agent, or Firm* — Philip J. Feig

(57) ABSTRACT

A method for high rate data delivery in a multi-hop vehicular network comprises at each source vehicle, initiating a packet having a flow tag, assigning an identifier of the content and the current location to the flow tag, and forwarding the packet; at each destination vehicle, setting a flow request and broadcasting at the current intersection; further on movement, setting the flow request at the new intersection, and at each intersection, selecting a header vehicle at the intersection, computing backlog and congestion indicators and listening for broadcasts with a matrix and the flow requests at the header vehicle, determining if the matrix is present, updating the matrix in accordance with the backlog and congestion indicators if the matrix is present, initializing the matrix and estimating the delay on the outgoing road segments if the matrix is not present, forwarding the packet flow, and broadcasting the matrix from the header vehicle.

10 Claims, 4 Drawing Sheets

U.S. PATENT DOCUMENTS

| | | |
|---|---|---|
| 2008/0015771 A1 | 1/2008 | Breed et al. |
| 2008/0039113 A1* | 2/2008 | Liu et al. .................... 455/456.1 |
| 2008/0056210 A1 | 3/2008 | Yaqub |
| 2008/0095134 A1 | 4/2008 | Chen et al. |
| 2008/0218382 A1 | 9/2008 | Kavaler |
| 2009/0105942 A1* | 4/2009 | Lin et al. ....................... 701/202 |
| 2009/0238187 A1* | 9/2009 | Guha et al. .................... 370/392 |
| 2009/0274093 A1* | 11/2009 | Senouci et al. ............... 370/328 |
| 2009/0323549 A1* | 12/2009 | Jerbi et al. ................... 370/252 |
| 2010/0214934 A1* | 8/2010 | Conan et al. .................. 370/252 |

* cited by examiner (a) ROADWAYS (b) REPRESENTATION OF ROADWAYS AS GRAPHS $$\max \sum_{r} \sum_{<i,j>} x_{ij}^{r} \cdot f_{i}^{r} \quad (1)$$

$$\text{s.t.} \sum_{j \in V} x_{kj}^{r} + g_{k}^{r} = \sum_{j \in V} x_{jk}^{r} + f_{k}^{r} \; \forall r \; \forall k. \quad (2)$$

$$\sum_{r} x_{ij}^{r} \leq \frac{K}{d_{ij}} \; \forall i \; \forall j \quad (3)$$

$$x_{ij} \in R^{+} \quad (4)$$

FIG. 3

INTERSECTION k COMPUTES THE INDICATOR $$\epsilon_n^{r,k} = \begin{cases} 1 \text{ if } \sum_{j \in V} x_{kj}^{n,r} + g_k^r > \sum_{j \in V} x_{jk}^{n,r} + f_k^r \\ 0 \text{ if } \sum_{j \in V} x_{kj}^{n,r} + g_k^r = \sum_{j \in V} x_{jk}^{n,r} + f_k^r \\ -1 \text{ if } \sum_{j \in V} x_{kj}^{n,r} + g_k^r < \sum_{j \in V} x_{jk}^{n,r} + f_k^r \end{cases}$$

$$a_n^{k,j} = \begin{cases} 0 \text{ if } \sum_r x_{kj}^{n,r} \leq \dfrac{K}{d_{kj}^n}, \\ 1 \text{ if } \sum_r x_{kj}^{n,r} > \dfrac{K}{d_{kj}^n}. \end{cases}$$

INTERSECTION k UPDATES $$x_{kj}^{n+1,r} = \left[ x_{kj}^{n,r} - \delta_n (\gamma (\epsilon_n^{r,k} - \epsilon_n^{r,j} + a_n^{k,j}) - f_k^r) \right]_+ . \quad (5)$$

FIG. 4

| $x_{ij}/R$ | a | DELAY (ms) | 1 | 2 | 3 |
|---|---|---|---|---|---|
| A | 1 | 4000 | (0,-1) | (0,1) | (0,0) |
| B | 0 | 8 | (0.6,0) | (0,0) | (0.2,1) |
| C | 0 | 25 | (0,0) | (0.3,-1) | (0.5,0) |
| D | 0 | 15 | (0.4,1) | (0.7,0) | (0.3,0) | ns
ACHIEVING HIGH-RATE MULTI-HOP DATA DELIVERY IN VEHICULAR NETWORKS

CROSS REFERENCE TO RELATED APPLICATIONS

The present invention claims the benefit of U.S. provisional patent application 61/098,430 filed Sep. 19, 2008, the entire contents and disclosure of which are incorporated herein by reference as if fully set forth herein.

FIELD OF THE INVENTION

The present invention relates generally to connectivity in multi-hop vehicular networks, and more particularly to achieving high data rate connectivity in multi-hop vehicular networks.

BACKGROUND OF THE INVENTION

Vehicular communications have been considered to be an enabler for numerous safety and information applications. Many automobile manufacturers are in different stages of integrating communication devices in their vehicles for the purpose of safety, assisted driving, entertainment, and commerce. Numerous projects worldwide, e.g. in Europe, in the U.S. and in Japan, are actively involved in researching and developing the infrastructure for vehicular communications and automotive telematics.

Through vehicular ad-hoc networks, it would be possible to achieve flexible communications among vehicles and with the roadway units or the infrastructure. Multi-hop data dissemination capability is one of the major advantages of vehicular networks. Multi-hop dissemination can be used for enhancing the coverage of safety and emergency warning messages, exchanging neighborhood information queries, etc.

At the same time, the high mobility and the partitioned nature of the networks makes multi-hop data delivery through vehicular networks complicated. Moreover, because of the time-scale of auto manufacturing, it is expected that the fraction of automobiles on the roads equipped with communication radios will be fairly low to begin with and will increase gradually. Due to the low equipped vehicle density, a store and forward method, where vehicles buffer packets and transmit when another vehicle is in range, would be the primary data relaying strategy initially.

Due to the unpredictable nature of vehicular networks, any data dissemination strategy needs to take into account a diverse range of roadway and network parameters such as vehicle speeds, direction, density radio range, roadway lengths etc. Also, numerous safety applications require group-based communication. To cater to such requirements, various broadcast and flooding protocols have been considered, such as message dissemination using local attributes, e.g., position and direction, broadcast interval, and roadway segments, as well as a mobility centric approach for data dissemination (MDDV), which provides a hybrid approach for reaching geocast areas and providing local dissemination based on source defined trajectories, and dynamic organization of vehicles into peer groups for efficient local information dissemination.

Further, for end-to-end communication, various position based routing protocols have also been proposed for vehicle ad hoc networks. Position-based routing consists of 1) a location service which maps node ID (IP address) to geographical position (GPS); and 2) a forwarding scheme which selects the next hop based on the geographical information of the node, neighbors, destination, and other mobility parameters.

As a result of the high variability of the parameters, it is difficult for heuristic based forwarding methods to function well under the entire range of network conditions. While characterization and modeling of various parameters of vehicular networks such as mobility, wireless channel, delay performance have already received significant attention, there is a need for optimal algorithms based on available system characterization methods.

SUMMARY OF THE INVENTION

An inventive system and method to systematically utilize locally available information in real-time for achieving overall system-wide goals is presented. The inventive distributed protocol for multi-hop data dissemination achieves these goals of maximum data rates under a wide range of network conditions in vehicular networks. The invention maximizes the end-to-end data rate observed by the flows in a vehicular network. A distributed protocol enables data queries to be efficiently forwarded to the destination using the roadways that guarantee the maximum rate. The forwarding decisions adapt to changing network and roadway conditions.

The inventive system and method includes a framework that guarantees that the paths that can support the maximum rate is used for data dissemination. The protocol requires minimal state information and the methods converge despite loss or error in state information. The data rates observed by the sessions in a vehicular network are the main focus of the invention but other such data rates could be considered. In addition, the location or the position of the recipient is not assumed for initiating data flows in the inventive protocol. The forwarding directions that achieve the maximum rate are calculated dynamically based on local estimation and available state information and rapidly adapt to changes in the network. Exchange of position information between vehicles is not required, and mobility-induced dynamic network conditions are adapted to.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIG. 3 shows a distributed algorithm to maximize rate;

FIG. 4 shows an exemplary table of state information maintained at intersections by vehicles;

DETAILED DESCRIPTION

An inventive system and method for multi-hop data dissemination that achieves maximum data rates under a wide range of network conditions in vehicular networks is presented. Low equipped density results in end-to-end delays that are of the scale of vehicle mobility. Such networks have been considered as delay tolerant networks. The delay is dependent on the equipped vehicle density, radio range, vehicle speeds, etc. The inventive mechanism has a protocol that can operate in a distributed fashion. The method or protocol rapidly adapts to change in parameters and other perturbations. Moreover, incremental computation based on prior information is supported to minimize the convergence time.

Figures 1, 2:
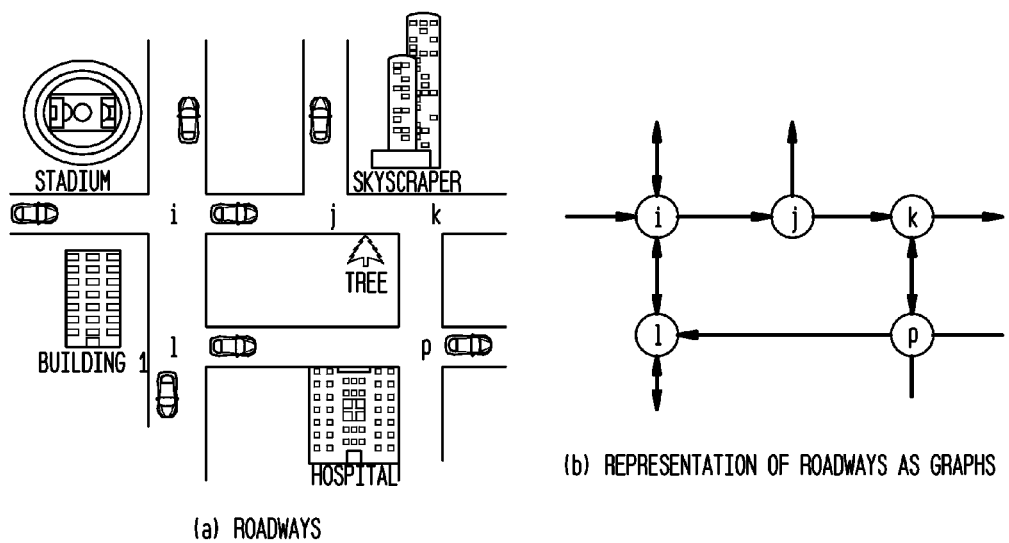
FIG. 1 is a representation of a Roadway system as a Graph.
FIG. 2 shows a centralized formulation for optimizing data rates.

The delay model used to estimate the delay experienced on a particular roadway is defined as follows. FIG. 1 shows a representation of a Roadway system as a graph. The road network as shown in (a) of FIG. 1 is modeled as a graph with the intersection as nodes and the roadways as edges as shown in (b) of FIG. 1. The term intersections includes stop signs, traffic lights, highway interchanges etc. The intersections are indexed by i and j and ij denotes the road between i and j.

Let:
$d_{ij}$ denote the delay experienced on roadway ij
$l_{ij}$ denote the physical length of road way ij
$v_{ij}$ denote the average vehicle speed on segment ij
$\rho_{ij}$ denote the vehicle density on segment ij Note that all the above parameters except $l_{ij}$ are time varying.

The delay $d_{ij}$ on a roadway is modeled as:

$$d_{ij} = \begin{cases} \alpha l_{ij} & \text{if } 1/\rho_{ij} \leq R, \\ \frac{l_{ij}}{v_{ij}} - \beta \rho_{ij} & \text{if } 1/\rho_{ij} > R. \end{cases}$$

Here, $\alpha$, $\beta$ are constants and R is the radio range. For high vehicle densities, that is, when the inter-vehicle distances are less than the radio range (R), the message gets forwarded via wireless propagation. The delay is then dependent on the roadway length. On the other hand, when the inter-vehicle distances are more than the radio range, the messages are propagated via a store and forward strategy. Even in this case, wireless transmission also occurs which results in a reduction in delay ($\beta \rho_{ij}$).

The above parameterized representation of the delay model captures the essentials of a store and forward strategy and can be extended in several ways. The inventive method is amenable to different ways of estimating the delay; a representative one is chosen. Note that detailed estimation procedure and analysis of the delay model is outside the scope of this work.

A vehicular network can have multiple data sessions, each with different sources and destinations. Local heuristics for forwarding often lead to poor decisions, especially in the case when the size of the roadway system increases or when the message has to traverse multiple intersections. Moreover, the traffic and propagation conditions on each roadway can change rapidly with time, resulting in incorrect path computation. For addressing this issue, the forwarding direction is dynamically computed from neighborhood information using a distributed algorithm. This enables maximization of data rates observed by all the data flows in the network.

A formulation that models the end-to-end data dissemination delay in the network is presented. Let r denote a flow tag with source intersection $s_r$ and a destination $d_r$. Let V be the set of intersections. $f_k^r$ is 1, if intersection k is an originator of flow r and 0 otherwise. $g_k^r$ is 1 if intersection k is a destination of flow r and 0 otherwise. The rate of flow r on road ij is denoted by $x_{ij}^r$.

The centralized version of the optimization is shown in FIG. 2. K is a constant. The cumulative rate of all the flows, which is shown as Equation (1) in FIG. 2, can be maximized. Various fairness and priority considerations can be incorporated into the model but the base case is chosen for simplicity of exposition. The formulation shown in FIG. 2 only captures a snapshot of the network wide optimization and is similar to a multi-commodity flow. However, in a real system, the trivial method of solving a centralized program will fail owing to the dynamic nature of the $d_{ij}$, and the initiation and termination of flows. $d_{ij}$ change with time and may be very large if vehicles do not exist on a path. Moreover, messages might not even be sent on a computed path due to non-availability of a vehicle. In such a case, an alternate path is to be used.

A distributed version of the optimization is as follows. Let $\gamma$ be a constant and $\{\delta_n\}$ be a sequence of real number (stepsizes) that satisfy $\lim_{n \to \infty} \delta_n = 0$ and $\Sigma_{n=1}^{\infty} \delta_n = \infty$. For example, $\delta_n = 1/n$ satisfies the conditions. The goal of the distributed optimization is to compute the variables $x_{ij}$ of the optimization presented in FIG. 2. This can be achieved by the algorithm shown in FIG. 3.

For all $\gamma > 1$, the distributed iterative algorithm in FIG. 3 converges to the optimal solution, irrespective of the initial choice of the iterates. Also, arbitrary initialization of this algorithm is allowed from any point. If an optimal solution $X_0$ is computed, and then the system parameters alter, the new optimum solution can be found starting from $X_0$. This speeds up the convergence significantly when adapting to changes in the network.

The variable $x_{ij}^{n,r}$ is the value of $x_{ij}^r$ at the n-th iteration. $[\bullet]+$ denotes the projection on $[0, \infty)$. The iterative computation is only performed at intersections by vehicles that have active data packet flows. In iteration n, a backlog indicator $\epsilon_n^{r,k}$ is calculated at the intersection. The indicator can be represented using only two bits and needs to be communicated only to neighboring intersections though vehicle forwarding. Based on local delay estimation, a single bit congestion indicator $a_n^{k,j}$ is computed at the intersection. The computation in Equation (5) in FIG. 3 can then be performed. It is important to note that the computation can be done asynchronously at different intersection vehicles and this eliminates the need for time synchronization.

The implementation of the protocol which is based on the distributed algorithm in FIG. 3 is described and its performance is evaluated below. Accordingly, the usage of the proposed distributed scheme for packet forwarding is discussed and the performance through simulations is presented.

A roadway system with several vehicles that initiate data flows is presented. The state information at intersections is maintained on vehicles as a matrix as shown in FIG. 4 which depicts the information maintained at Intersection Vehicles. a is a bi-level congestion indicator for each roadway. The first component of each entry determines the fraction of a flow on to a particular roadway. The second entry is the tri-level (+1,0,−1) backlog indicator $\epsilon$ received from the neighboring intersection and is 0 by default. R denotes the flows passing through the intersection with labels 1, 2 and 3; j denotes the neighboring intersections with names A, B, C and D. For example, since the first entry at (C, 2) is 0.3, thirty percent (30%) of flow 2 is sent to intersection C. This matrix is updated at every iteration asynchronously.

The delay column in FIG. 4 ("Delay (ms)") is the current estimated delay on the outgoing roadways based on the model described above. The matrix requires a storage size of 4 Bytes per data flow for every outgoing roadway and can be initialized arbitrarily. The matrix entries are updated according to the iterative procedure described in FIG. 3. The computation adapts the routing decisions based on the changing vehicle positions. This is achieved by adjusting variables at intersections as the vehicles move.

The protocol steps are as follows.

At Source Vehicles
1) Source labels packets with the flow tag and sends in accordance with the matrix.

At Destination Vehicles
1) If the destination of flow r' moves to intersection k' set $g^{r'}_{k'}=1$ at intersection and broadcast.

At Intersection Vehicles
1) Vehicles know the intersection location through onboard maps and GPS information.
2) A vehicle is selected as Intersection Header (IH), for example based on a random countdown timer and vehicle ID.
3) IH vehicles compute backlog indicators and listen for broadcast with matrix and current flow requests, g.
4) If broadcast not received, initialize matrix and estimate delay.
5) Estimate delay and update matrix according to FIG. 3.
6) Packets for each flow forwarded according to the matrix.
7) IH vehicles leaving intersection broadcast the matrix at periodic intervals until it arrives at the next intersection.

Figure 5:
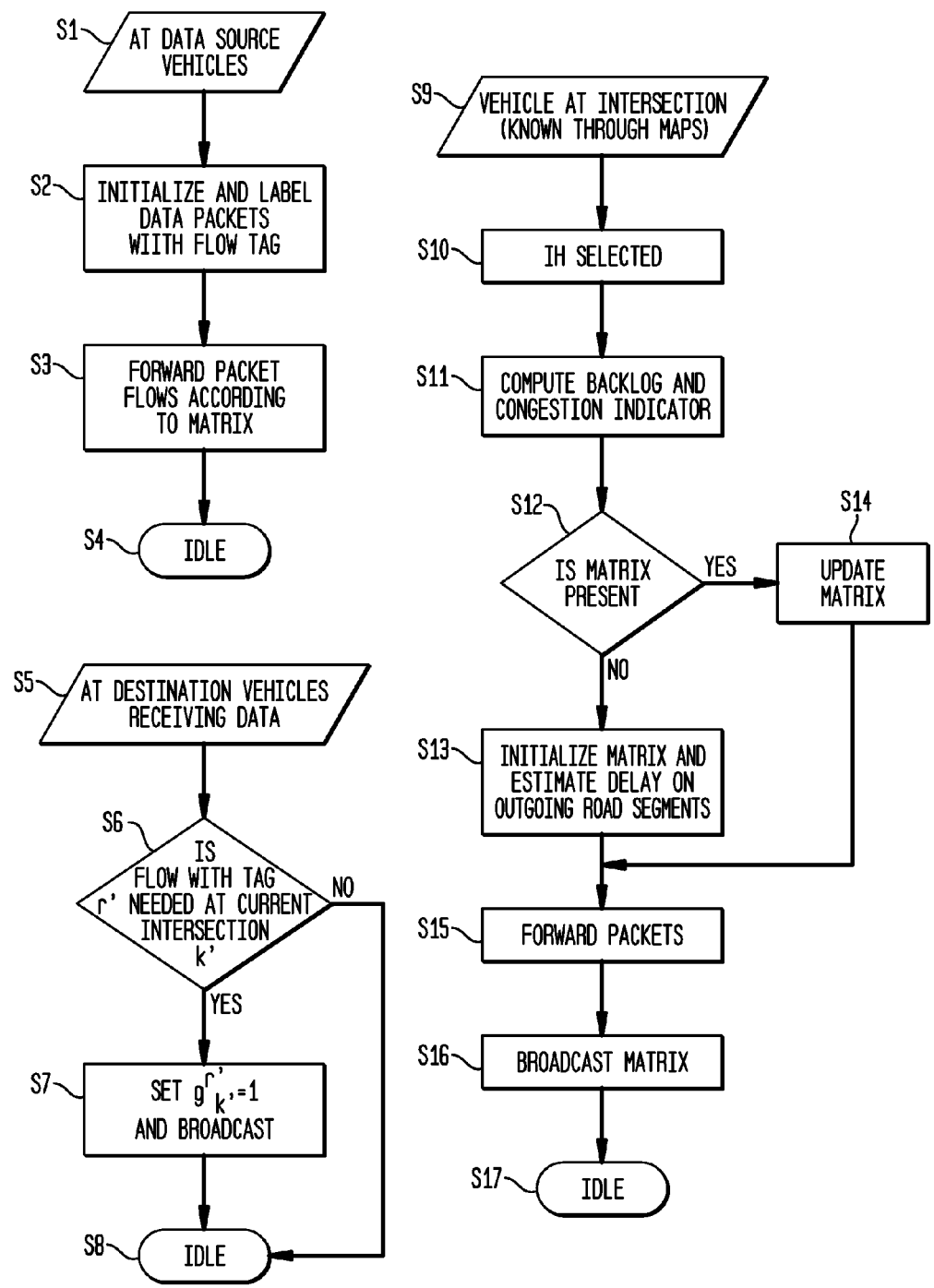
FIG. 5 is a flow diagram of the inventive method.

FIG. 5 is a flow diagram of the inventive method. At source vehicles, data is available to send in step S1. In step S2, the packets are labeled at the source with flow tags. An example of data is an intersection video stream and the corresponding flow tag can be the name of the intersection and the type of video. In step S3, the labeled packets are sent according to the matrix. In step S4, the source vehicle waits for additional data from an application.

The destination vehicles receive requested data in step S5. If the destination vehicle of a flow tag r' moves to intersection k' (S6=YES), ($g^{r'}_{k'}$) is set to 1 and broadcast in step S7. If not (S6=NO), step S7 is not performed. In step S8, the vehicle waits for new data requests from applications or waits for an event triggered by its own physical movement from one intersection to another to reset flags for existing data flows.

At Intersection Vehicles, multiple, distributed tasks are performed. Each vehicle at the intersection obtains its location, in step S9, through onboard maps and GPS information. Other methods of determining a vehicle location can also be used. In step S10, a vehicle is selected as Intersection Header (IH); this selection can be done based on a random countdown time and vehicle ID. Other methods of selection can be used. In step S11, IH vehicles compute backlog indicators c and listen for broadcasts with matrix and current flow requests. If a broadcast is not received, that is, a matrix is not present (S12=NO), the matrix is initialized and the delay is estimated in step S13. If the broadcast is received (S12=YES), the received information is used to estimate delay and update the matrix in step S14. Updating the intersection k in the matrix $x_{ij}$ is performed as shown in FIG. 3 (Intersection k updates).

The packets for each flow are forwarded in step S15, according to the matrix. Each IH vehicle leaving the intersection broadcasts the matrix at periodic intervals until IH arrives at the next intersection, in step S16. In step S17, vehicles wait for an event triggered by arrival at a new intersection.

For the performance evaluations, each source generates 512 Byte packets at 1000 packets per second. Consider 100 vehicles in an area of size 3000 meters by 3000 meters with 20 intersections and vehicle speeds ranging from 30-110 km per hour, and further consider 5 end-to-end sessions whose source and destination are randomly selected. Use the 802.11 MAC with DCF and the radio range of 100 meters.

Figure 6:
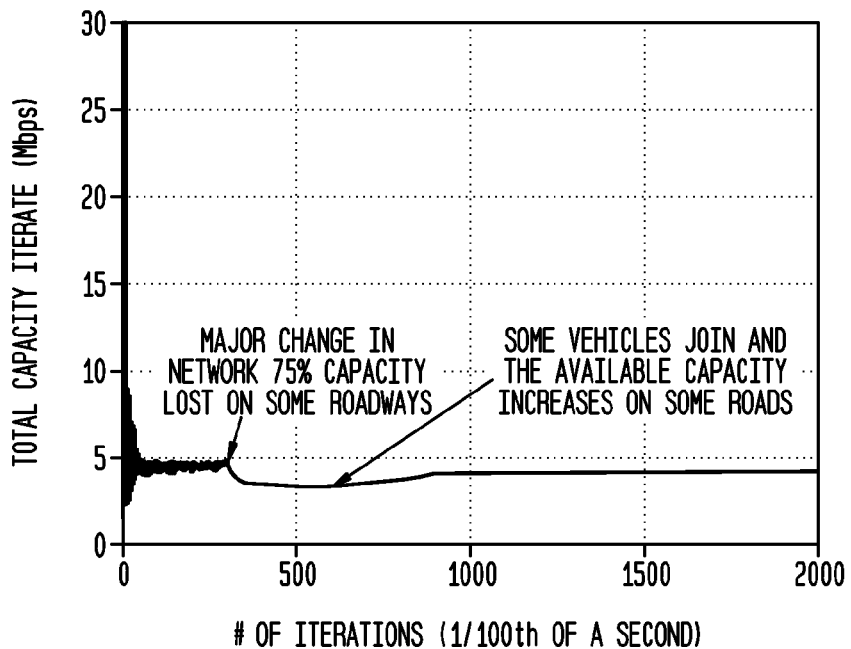
FIG. 6 shows convergence of the total rate with time.

FIG. 6 plots the aggregate rate of the flows with time. Here, the system starts at an arbitrary state, and it is observed that the total rate quickly converges to the minimum achievable instantaneous delay. The actual convergence point can be defined based on some criteria such as relative change. At t=3 seconds (iteration 300), the estimated capacity on some roadways reduces by 75% and at iteration 600, the capacity on some roadways increases due to entering vehicles. As noted, the fluctuation due to these changes in the network is minimal as the algorithm again computes to the optimal operating point.

Figure 7:
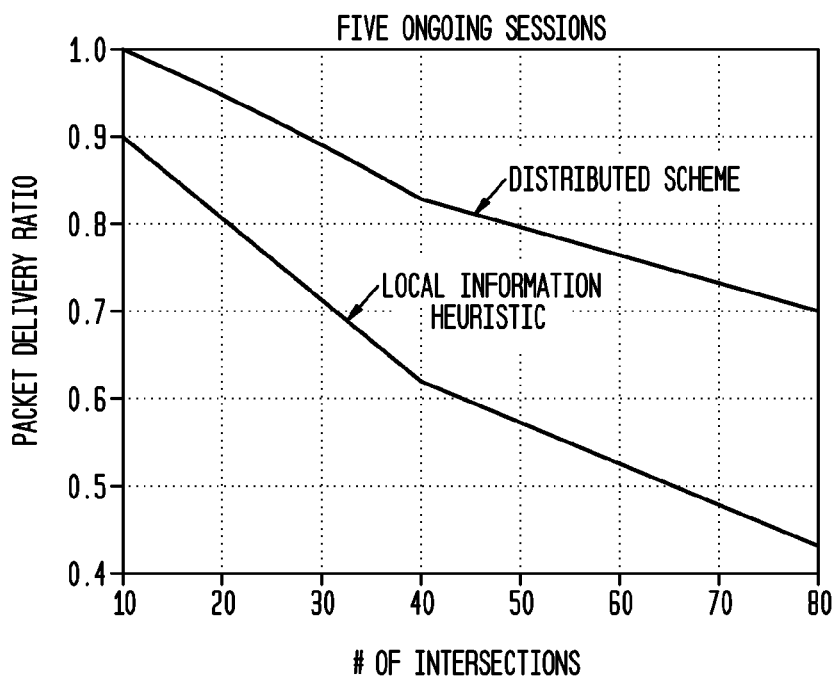
FIG. 7 shows a comparison of the performance of the inventive method with an existing scheme in terms of packet delivery ratio.

Next, the number of intersections is varied while keeping the total area the same. FIG. 7 shows the packet delivery ratio (PDR) as compared with a heuristic that selects forwarding path based on instantaneous best intersection. Due to the higher number of intersections, the number of end-to-end choices of paths increases significantly. The PDR is observed to be significantly higher as the number of intersections increase.

The present invention provides a benefit of enabling dissemination of information of multiple types, including safety messages such as warnings, notifications of accidents, etc., and video messages, such as views of specific intersections. Advantageously, the maximum total bandwidth can be obtained when high bandwidth is needed, for example for high volume video messages. An additional benefit of the inventive method is the ability to create paths from one position to another position, such as from a vehicle to a particular street intersection, using only the specific location information. No location service is needed. Hence, a vehicle can easily obtain a video of a specific intersection prior to arriving at that intersection, using maximum total bandwidth if appropriate.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perforin collaboratively, or may include one or more stand-alone components. The hardware and software components of the computer system of the present application may include and may be included within fixed and portable devices such as desktop, laptop, and server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method for high rate data delivery in a multi-hop vehicular network having a plurality of vehicles and a plurality of intersections, said method comprising steps of:

at each source vehicle:
initiating a packet having a flow tag;
assigning an identifier of a content and a current location to the flow tag; and
forwarding the packet;

at each destination vehicle:
setting a flow request and broadcasting at a current intersection, the flow request associated with a packet requesting a next hop in the network; and
on movement of the destination vehicle, setting the flow request at a new intersection;

at each intersection:
selecting a header vehicle at the intersection;
computing a backlog indicator and a congestion indicator and listening for broadcasts with a matrix and the flow requests at the header vehicle, the matrix including an estimated delay for one or more outgoing roadways from the intersection and one or more data flow rates, the backlog indicator associated with a data flow backlog and the congestion indicator associated with congestion of data flows;
determining if the matrix is present;
updating the matrix in accordance with the backlog and congestion indicators if the matrix is present;
initializing the matrix and estimating the estimated delay if the matrix is not present;
forwarding the packet; and
broadcasting the matrix from the header vehicle.

2. The method according to claim 1, wherein the step of forwarding at the source vehicle is done without knowledge of destination location or recipient information.

3. The method according to claim 1, wherein the step of selecting is performed based on random countdown and vehicle ID.

4. The method according to claim 1, wherein the step of broadcasting is performed when the header vehicle leaves the intersection and periodically thereafter.

5. The method according to claim 1, wherein the matrix includes the backlog indicator and a forwarding component.

6. A non-transitory computer readable medium having computer readable program for operating on a computer for high rate data delivery in a multi-hop vehicular network having a plurality of vehicles and a plurality of intersections, said program comprising instructions that cause the computer to perform the steps:

at each source vehicle:
initiating a packet having a flow tag;
assigning an identifier of a content and a current location to the flow tag; and
forwarding the packet;

at each destination vehicle:
setting a flow request and broadcasting at a current intersection, the flow request associated with a packet requesting a next hop in the network; and
on movement of the destination vehicle, setting the flow request at a new intersection;

at each intersection:
selecting a header vehicle at the intersection;
computing a backlog indicator and a congestion indicator and listening for broadcasts with a matrix and the flow requests at the header vehicle the matrix including an estimated data dissemination delay for one or more outgoing roadways from the intersection and one or more data flow rates for data flows outgoing from the intersection, the backlog indicator associated with a data flow backlog and the congestion indicator associated with congestion of data flows;
determining if the matrix is present;
updating the matrix in accordance with the backlog and congestion indicators if the matrix is present;
initializing the matrix and estimating the estimated delay if the matrix is not present;
forwarding the packet; and
broadcasting the matrix from the header vehicle.

7. The non-transitory computer readable medium according to claim 6, wherein the step of forwarding at the source vehicle is done without knowledge of destination location or recipient information.

8. The non-transitory computer readable medium according to claim 6, wherein the step of selecting is performed based on random countdown and vehicle ID.

9. The non-transitory computer readable medium according to claim 6, wherein the step of broadcasting is performed when the header vehicle leaves the intersection and periodically thereafter.

10. The non-transitory computer readable medium according to claim 6, wherein the matrix includes the backlog indicator and a forwarding component.

* * * * *

UNITED STATES PATENT AND TRADEMARK OFFICE
CERTIFICATE OF CORRECTION

PATENT NO.         : 8,169,897 B2
APPLICATION NO.    : 12/563420
DATED              : May 1, 2012
INVENTOR(S)        : Guha et al.

Page 1 of 1

It is certified that error appears in the above-identified patent and that said Letters Patent is hereby corrected as shown below:

In the Specification

In Column 5, Line 48, delete "c and" and insert -- $\varepsilon$ and --, therefor.

In Column 6, Line 57, delete "perforin" and insert -- perform --, therefor.

Signed and Sealed this
Eighteenth Day of November, 2014

Michelle K. Lee
*Deputy Director of the United States Patent and Trademark Office*